(12) United States Patent
Fehrmann et al.

(10) Patent No.: US 7,493,524 B2
(45) Date of Patent: Feb. 17, 2009

(54) NETWORK WITH REDUNDANCY PROPERTIES, A BRANCHING UNIT FOR A USER DEVICE IN A NETWORK, REDUNDANCY MANAGER FOR A NETWORK WITH REDUNDANCY PROPERTIES AND METHOD FOR OPERATING A NETWORK WITH REDUNDANCY PROPERTIES

(75) Inventors: Holger Fehrmann, Magdeburg (DE); Friedhelm Geiger, Spring Hose, PA (US); Gerhard Hammer, Neupotz (DE); Klaus Röther, Stutensee (DE)

(73) Assignee: Siemens Aktiengesellschaft, Munich (DE)

( * ) Notice: Subject to any disclaimer, the term of this patent is extended or adjusted under 35 U.S.C. 154(b) by 379 days.

(21) Appl. No.: 10/561,478

(22) PCT Filed: Nov. 26, 2004

(86) PCT No.: PCT/EP2004/013455

§ 371 (c)(1),
(2), (4) Date: Dec. 21, 2005

(87) PCT Pub. No.: WO2005/053221

PCT Pub. Date: Jun. 9, 2005

(65) Prior Publication Data

US 2007/0109958 A1    May 17, 2007

(30) Foreign Application Priority Data

Nov. 27, 2003  (DE) ................................. 103 56 118
Nov. 15, 2004  (DE) ........................ 10 2004 055 053

(51) Int. Cl.
*G06F 11/00* (2006.01)

(52) U.S. Cl. ..................... 714/43; 370/222; 713/340; 710/100
(58) Field of Classification Search .................. 714/43; 370/222

See application file for complete search history.

(56) References Cited

U.S. PATENT DOCUMENTS

| 4,209,666 | A | * | 6/1980 | Lawton | 370/222 |
|---|---|---|---|---|---|
| 5,218,600 | A | * | 6/1993 | Schenkyr et al. | 370/217 |
| 6,160,648 | A | * | 12/2000 | Oberg et al. | 398/4 |
| 6,260,004 | B1 | * | 7/2001 | Hays et al. | 702/183 |

(Continued)

FOREIGN PATENT DOCUMENTS

DE    198 44 185 C2    3/2000

(Continued)

*Primary Examiner*—Emerson C Puente (57) ABSTRACT

The invention relates to a network, in particular a PA PROFIBUS network having redundant properties and a linear topology. Two line ends are connected to a redundancy manager which disconnects said line ends in error-free conditions and connects them in error conditions. Said redundancy manager supplies voltage to the first line end for operating customers' mobile telephones each of which is connected to the network by a branching unit. After receiving a supply voltage on one connection thereof, said branching units check the state of a cable which is connected to the other network connection and transmit the supply voltage in the faultless condition thereof only. When the redundancy manager does not detect the supply voltage on the other end of the line end at least during a predetermined space of time after voltage supply, said redundancy manager supplies the voltage thereto. A cable having a disturbance is then disconnected from the line by the adjacent branching units.

17 Claims, 7 Drawing Sheets

U.S. PATENT DOCUMENTS

| | | | |
|---|---|---|---|
| 6,430,151 B1 * | 8/2002 | Glas et al. | 370/222 |
| 6,965,560 B2 * | 11/2005 | Ying et al. | 370/222 |
| 2003/0037272 A1 * | 2/2003 | Flaschka et al. | 713/340 |
| 2007/0109958 A1 * | 5/2007 | Fehrmann et al. | 370/217 |

FOREIGN PATENT DOCUMENTS

| | | |
|---|---|---|
| DE | 199 16 894 A1 | 10/2000 |
| DE | 199 42 937 A1 | 3/2001 |
| DE | 102 07 529 A1 | 9/2003 |
| EP | 0 551 114 A1 | 7/1993 |
| WO | WO 98/30961 A1 | 7/1998 |

* cited by examiner

| State | U1 | K=U2/U1 | S0 | S1 | S2 | Next state | Remarks |
|---|---|---|---|---|---|---|---|
| IDLE | <U0 | — | off | on | on | IDLE | |
|  | >U0 | — | off | on | on | TEST1 | |
| TEST1 | >U0 | <2/5 ≥1/10 | off | on | on | TEST2 | Trunk cable 2 OK |
|  | >U0 | <1/10 | | | | SHORT | Trunk cable 2 short circuited |
|  | >U0 | ≈1/2 | | | | OPEN | Trunk cable 2 open circuit |
|  | >U0 | >1/2 | | | | OK | Feed also via trunk cable 2 |
| TEST2 | >U0 | <2/5 ≥1/10 | off | off | on | OK | Trunk cable 2 OK |
|  | >U0 | <1/10 | | | | SHORT | Trunk cable 2 short circuited |
|  | >U0 | ≈1/2 | | | | OPEN | Trunk cable 2 open circuit |
| SHORT | >U0 | <1/10 | on | off | on | SHORT | Trunk cable 2 short circuited |
|  | <U0 | — | on | off | on | IDLE | RESET from RM |
|  | >U0 | <2/5 ≥1/10 | | | | IDLE | Short circuit rectified |
|  | >U0 | ≈1/2 | | | | OPEN | Trunk cable 2 open circuit |
| OPEN | >U0 | ≈1/2 | off | off | off | OPEN | |
|  | <U0 | — | off | off | off | IDLE | RESET from RM |
|  | >U0 | <2/5 ≥1/10 | | | | IDLE | Open circuit rectified |
|  | >U0 | <1/10 | | | | SHORT | Trunk cable 2 short circuited |
| OK | >U0 | ≈1 | off | off | off | OK | |
|  | <U0 | — | off | off | off | IDLE | RESET from RM |

NETWORK WITH REDUNDANCY PROPERTIES, A BRANCHING UNIT FOR A USER DEVICE IN A NETWORK, REDUNDANCY MANAGER FOR A NETWORK WITH REDUNDANCY PROPERTIES AND METHOD FOR OPERATING A NETWORK WITH REDUNDANCY PROPERTIES

CROSS REFERENCE TO RELATED APPLICATIONS

This application claims priority to the German application No. 10356118.8, filed Nov. 27, 2003, to the German application No. 10 2004 055 53.0, filed Nov. 15, 2004 and to the International Application No. PCT/EP2004/013455, filed Nov. 26, 2004 which are incorporated by reference herein in their entirety.

FIELD OF INVENTION

The invention relates to a network, In particular a PA PROFIBUS network, with redundant properties, a branching element for a user device in said network, a redundancy manager for said network and a method for operating said network.

BACKGROUND OF INVENTION

In automation systems for manufacturing or process technology with "classic" wiring of field devices, for example measurement converters and/or control elements, in which the field devices are connected in each case via a 4-wire master cable and subdistributors by a separate pair of wires to a programmable logic controller, the failure of one of the field devices or of a transmission link to this field device has no effect on the function of a field device since the individual field devices are operated physically separated from one another.

SUMMARY OF INVENTION

With field devices which communicate via a field bus with the programmable logic controller, the bus cable forms a common component for all field devices and if it fails it affects all field devices. In addition errors in the field devices, for example a short circuit of the transmission line or sending out of noise signals on the transmission line, can adversely affect communication of the other field devices connected the bus cable. Because of the possibly reduced system availability field buses are not used in particularly critical applications or must be configured to provide redundancy.

In principal a distinction must be made between two different redundancy concepts in automation technology systems. On the one hand system redundancy improves the availability through a redundant, that is largely duplicated structure of the complete system, consisting of field devices, a bus system and programmable logic controllers. Coordination, i.e. which of the components must actively be operated at any given time and which are in standby mode is undertaken at programmable logic controller level and the controllers must be configured for this purpose. All other components are standard components. The other concept is media redundancy in which with the transmission media only the part of the communication system is arranged redundantly of which the failure would have particularly serious effects on the system availability. For example a high-availability field bus system is known from EP 0 287 992 B2 which features two bus lines over which identical messages are transmitted serially in each case. With a detector logic which is located in the connected users, test characters are evaluated for testing the function of the busses. If there are errors in the test character there is a switchover to receive by the other error-free bus. The redundant configuration of the transmission medium thus increases the availability of the bus system.

An Ethernet network with redundancy properties is known from EP 1 062 787 B1. The Ethernet network has a linear topology. The line ends are connected to a redundancy manager. The redundancy manager uses test telegrams to check the state of the network. If there is an interruption of the network the redundancy manager connects the line ends and thereby re-establishes a line structure and the operability of the network. The disadvantage here is that the test telegrams which are injected by the redundancy manager into the two ends of the line represent an additional network load for the network and thus reduce the transmission capacity of the network. This monitoring and switchover principal is also not simply transferable to bus systems in which, in addition to transmission of the data, the energy required for operating the user devices connected to the bus is transmitted over the bus.

An object of the invention is to create a network, in particular a PROFIBUS PA network with redundant properties and the option of remote power feeding of user devices, a branching unit for a user device in said network, a redundancy manager for said network and a method for operating said network, through which an increase in the availability of the network can be achieved with simple means.

This object is achieved by the claims. Advantageous developments of the network, the branching unit and the redundancy manager are to be found in the dependent claims.

The advantage of the invention is that the redundancy manager enables an error in the network to be detected and rectified comparatively rapidly. With an interruption or a short circuit in a cable segment no feed voltage is directed to this segment by the connected branching unit of a user device which in the positive case should be feeding over the segment the energy required for operation of the devices located beyond the segment, no feed voltage is routed on this segment or the forwarding of a feed voltage on this segment is interrupted. This means that the feed voltage no longer reaches the other end of the line which is connected to the redundancy manager. This is detected by the redundancy manager, which a short time after establishing the error state also feeds the required operating energy into the other end of the line. The defective cable segment is isolated by the two delimiting branching units and the network continues to be operable despite the error without any long interruption to operation. The communication in the network is also maintained in the event of an error without a higher-ranking network, especially a control system to which the network is connected, being disturbed or called on in any other way.

By contrast with the method known from EP 1 062 787 B1 mentioned a above, in which the status of the network is checked with a test telegrams, the invention has the advantage that errors are able to be detected as soon as they have occurred and not just at the point at which test telegrams have been sent through the network. The reaction time of the known method of can be improved by increasing the frequency of the test telegrams, i.e. reducing the cycle time of the test telegram injection. However this would bring with it the disadvantage that the test telegrams would represent a significant additional network load. By contrast the invention advantageously completely avoids any additional load on the network with test telegrams.

A further advantage can be seen in the fact that the redundancy manager and the branching units of the present invention do not have to participate in data traffic in the sense of data processing. Therefore the implementation effort is lower, the power requirement is reduced and the availability is increased because of the lower device complexity. The expansion of an existing network by redundancy properties is more simple to implement.

Because the redundancy manager and the branching units are each provided with a termination element (terminating resistor) which can be connected in the case in which they are located at the end of the line in the relevant network topology, the signal transmission properties of the transmission link can be flexibly adapted to the prevailing topology after topology changes and thus the network is also suitable for higher baud rates.

Advantageously and especially simple implementation of a branching unit is achieved if this is provided with at least two switches and with a control unit, with the control unit being able to set the two switches so that the user device connected by the relevant branching unit to the network can be connected through to the one, to the other or to both network connections of the branching unit to obtain operating energy and for data transmission.

Advantageously it is made especially simple to test a cable connected to a branching unit for a short circuit or interruption if the branching unit features a resistor network in which the switches are arranged and when the switches can be controlled by the control unit such that current and/or voltage of the cable connected to the one or to the other network connection of the branching unit can be checked.

Since the switching times of the switches are not infinitely short the operating energy injected at the line end or line ends can be made available to the user devices in the event of an error in an uninterruptible manner. To resolve this problem at least one of the branching units, but especially each of them, features an energy store which at least in the fault-free state can be charged by the feed voltage; The branching unit is embodied to record the voltage present at the connected user device and in the event of a voltage deficit to connect the energy store to the user device.

As already mentioned, one advantage of the invention is that the redundancy manager and the branching unit do not have to take part in data traffic. An error, such as an interruption or a short circuit in a cable segment, can thus be displayed easily by the two branching units on both sides of the error location locally, for example using a light-emitting diode, however the redundancy manager can only detect the error status but not the error location. To enable the error location to be determined as well the redundancy manager advantageously features means which record the timing of the voltage and/or the current at the one end of the line during the forwarding of the feed voltage by the individual branching unit and from this determines the number of branching units up to the error location. The redundancy manager can display this information about the error location and/or notify a higher-ranking control system about it so that it can be established centrally where the error has occurred and is to be repaired. The redundancy manager thus preferably also has a communication interface for connection and exchange of data with a higher-ranking network in which the control system can be located.

By recording changes in the voltage and/or the current at least one of the two line ends the redundancy manager can determine state transitions of the network and thus establish when an error has been repaired.

To extend the redundancy of the inventive network beyond the redundancy manager through to a higher-ranking network, for example one containing a control system, the redundancy manager is preferably able to be connected via at least two segment couplers to at least two communication channels of the higher-ranking redundant network and is further embodied to monitor the functionality of the segment couplers and depending on the lists, to select one of the segment couplers for connection with the network.

BRIEF DESCRIPTION OF THE DRAWINGS

The invention, along with its embodiments and advantages, is explained in greater detail below with reference to the drawings in which an exemplary embodiment of the invention is shown. The figures show.

DETAILED DESCRIPTION OF INVENTION

Figure 1:
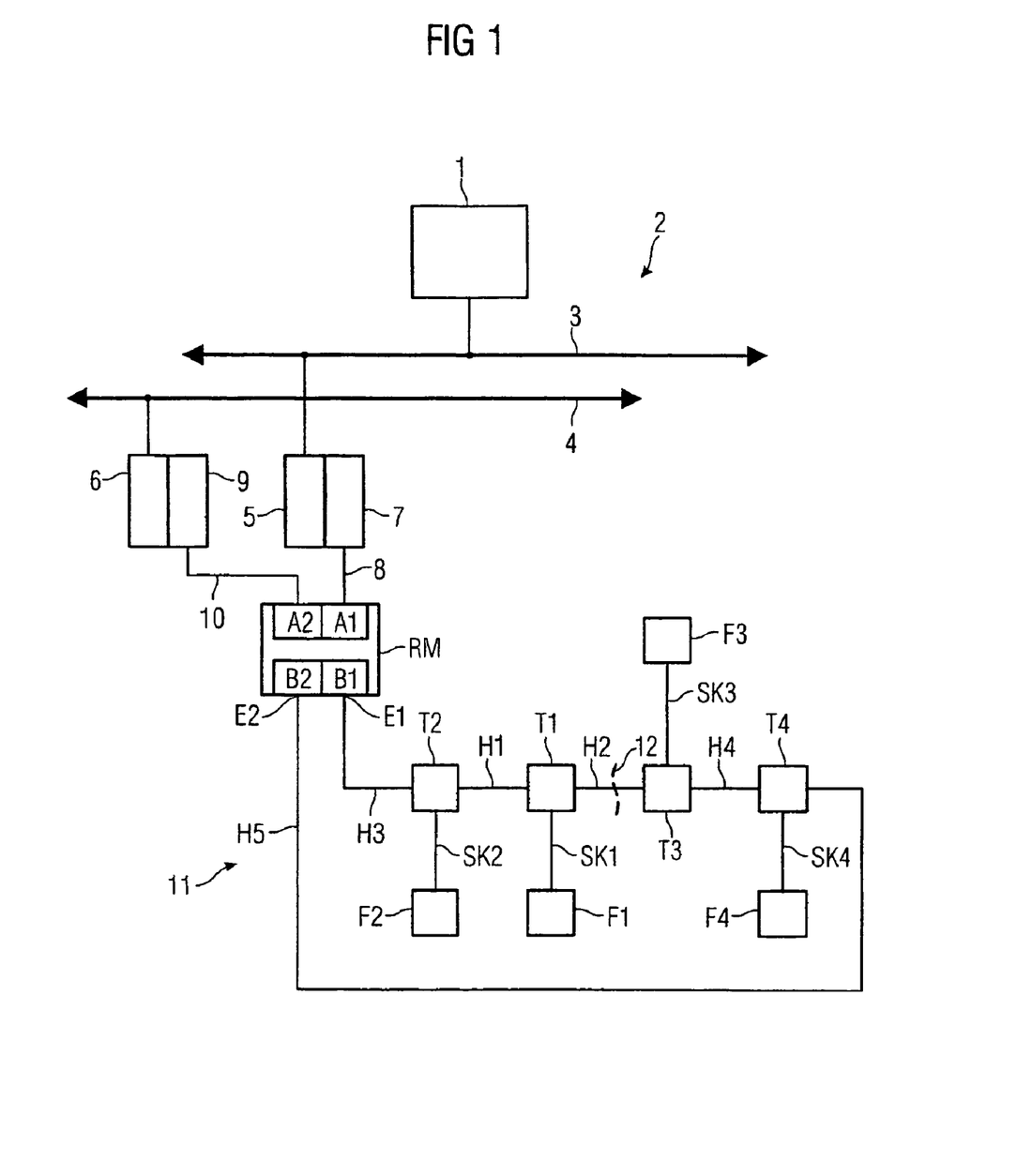
FIG. 1 a block diagram of a part of a automation technology system.

FIG. 1 shows a part of an automation technology system. A control system 1 is connected to a bus system 2 in accordance with the PROFIBUS DP Specification. The bus system 2 can be configured as a simple system, or to provide redundancy as shown here. At each of the two communication channels 3, 4 of the bus system 2, as well as other devices not shown here, for example automation units, a link 5 or 6 is connected in each case. The link 5 is linked to a segment coupler 7 which is connected via a drop cable 8 to a port A1 of a redundancy manager RM. The other link 6 is linked to a further segment coupler 9 which is connected via a further drop cable 10 to a port A2 of the redundancy manager RM. A network 11 which complies with the PROFIBUS PA specification and has a linear topology is connected to two further ports B1 and B2 of the redundancy manager RM. The one line end E1 of the network 11 is formed by the end of the trunk cable H3 connected to the port B1, which at its other end is connected to a network connection of a branching unit T2. The branching unit T2 and further branching units T1, T3, T4 serve to connect field devices F1, F2, F3, F4 as user devices to the network 11. In this case the field devices F1 . . . F4 are each connected via drop cables SK1, SK2, SK3 or SK4 to the relevant branching units T1 . . . T4.

So that a continuous line as a structure of the network 11 is achieved the other network connection of the branching unit T2 is linked by a trunk cable H1 to a network connection of the branching unit T1, the other network connection of the branching unit T1 by a trunk cable H2 to a network connection of the branching unit and T3 and the other network connection of the branching unit T3 by a trunk cable H4 to the network connection of the branching unit T4. The other network connection of the branching unit T4 is connected by a trunk cable H5 to the port B2 of the redundancy manager RM. The end of the trunk cable H5 located at the port B2 represents in the error-free case a second line end E2 of the linear network 11.

Via the trunk cables H3, H1, H2 and H4, as well as the data, energy to operate the field devices F1 . . . F4 is also transmitted. To this end each of the two segment couplers 7, 9 contains a direct current source and feeds direct current into both wires of the associated stub line 8 or 10. The redundancy manager RM selects one of the two redundant segment couplers 7, 9, in this case for example the segment coupler 7, and when the system starts up switches the relevant port A1 directly to port B1 so that the feed voltage made available by this segment coupler 7 is also present at port B1. In the error-free case the branching units T1 . . . T4 forward the feed voltage arriving in each case on the one network connection to the other network connection. This means that the feed voltage is successively switch through to the line end E2, which is located at port B2 of the redundancy manager RM. The redundancy manager RM monitors the incoming voltage at its port B2. If, after a delay depending on the network configuration, this does not comply with a predetermined required value, it is clear that there is an error present in network 11. This can for example be a short circuit or an interruption in one of the trunk cables H1 . . . H5.

An interruption of the trunk cable H2 between the branching units T1 and T3 will now be considered by way of an example, as is indicated in FIG. 1 by a dashed interruption line 12. This type of interruption is detected by the branching unit T1 which subsequently does not forward the feed voltage so that the branching units T3 and T4 as well as the port B2 of the redundancy manager RM are no longer reached. The redundancy manager RM detects the absence of the feed voltage at port B2 and subsequently applies a voltage to supply the field devices F3 and F4 which lie beyond the error location, i.e. in the example described, beyond the interruption 12, to its port B2. It does this by connecting the ports B1 and B2 and thereby the line ends E1 and E2 to each other. The supply voltage is switched through from port B2 via the branching unit T4 to the branching unit T3 which lies immediately beyond the error location, detects the error 12 and thus does not forward the supply voltage. With the establishment of the supply voltage for all field devices F1 . . . F4 the data transmission in the network 11 and thereby the further operation of the network 11 is safeguarded despite the error 12.

The method of operation described on start-up of the network 11 can also contain further steps in which data will be exchanged between the branching units and the redundancy manager and/or in the reverse direction with a method not described in any greater detail here. Such an exchange of data enables the reliability of the network 11 to be increased and its start up and error detection also simplified.

Figure 2:
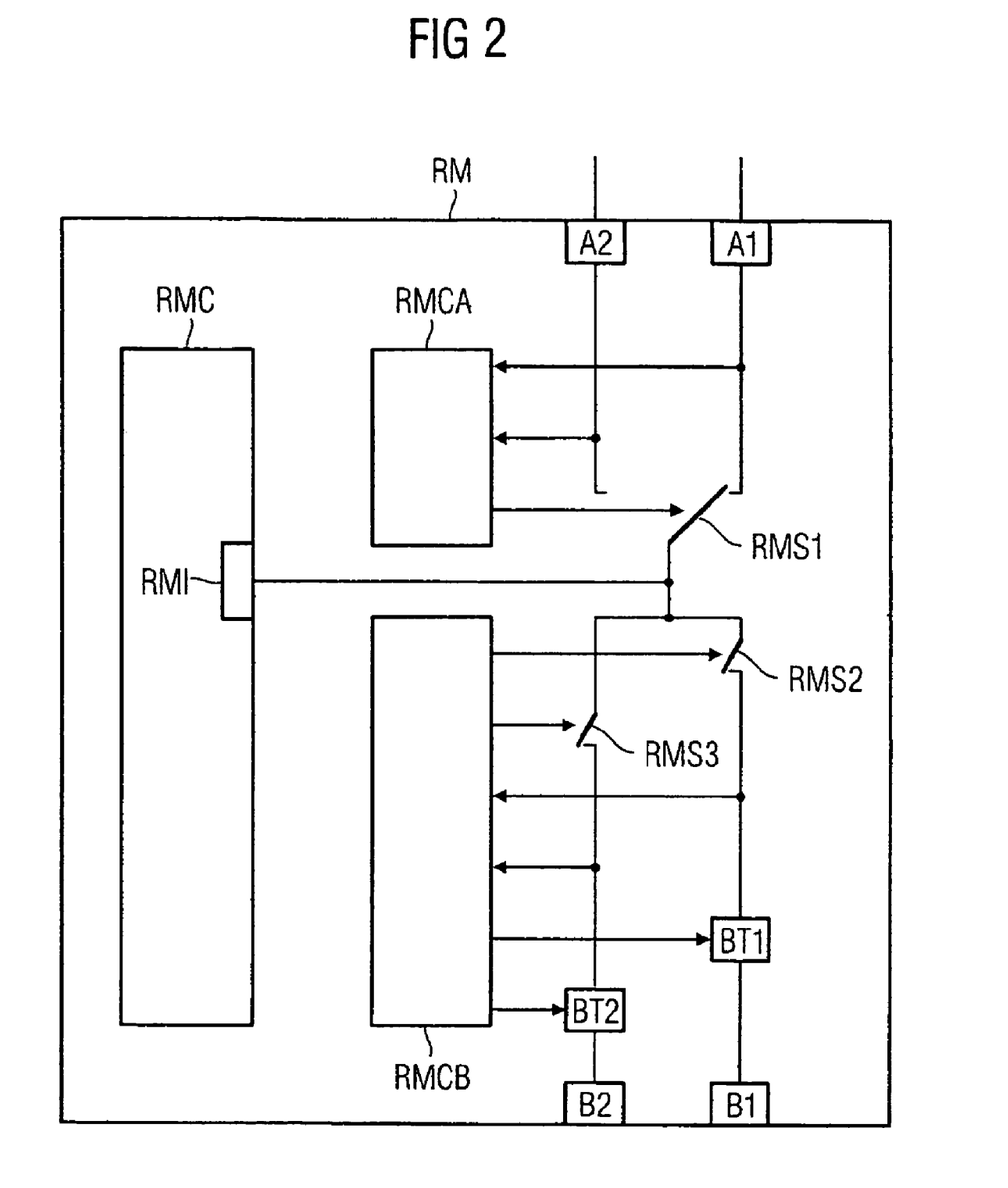
FIG. 2 a block diagram of a redundancy manager.

The redundancy manager RM shown in the example in FIG. 2 contains a first control unit RCMA assigned to the ports A1 and A2, a second control unit RCMB assigned to the ports B1 and B2 and higher-ranking controller RMC. The ports A1, A2, B1 and B2 are interconnected via a switching network with switched RMS1, RMS2 and RMS3, with switch RMS1 which can be controlled by the first control unit RMCA being used for selection of the two ports A1, A2 and the switches RMS2 and RMS3 which can be controlled by the second control unit RMCB connecting the relevant selected port A1 or A2 either with one of the two ports B1 and B2, with both ports B1, B2 or with neither of the ports B1 and B2. The ports B1 and B2 have termination elements BT1, BT2 in the form of terminating resistors, which can be activated or deactivated.

The first control unit RMCA monitors the currents and/or voltages at the ports A1 and A2 and in this way can monitor the segment couplers 7 and 9 (cf. FIG. 1) and in the event of an error initiate the switchover from the faulty segment couplers to the others. The second control unit RMCB monitors the currents and/or voltages at the ports B1 and B2 and thus, as already explained above, can detect whether an error is present in the network 11 and whether accordingly one of the two ports B1 and B2 is to be connected to the relevant selected port A1 or A2. In addition, as will be explained later, the second control unit RMCB can detect whether the error has been rectified in the network 11 and accordingly actuate the switches RMS2 and RMS3.

The higher-ranking control RMC is connected to the two control units RMCA and RMCB and has a communication interface RMI, in this case a PROFIBUS slave interface, for connection to the relevant selected port A1 or A2. This enables the redundancy manager RM to communicate with the higher-ranking control system 1 in order for example to transmit status information so that suitable measures can be taken to rectify the error, or to receive configuration commands.

Like the redundancy manager RM The branching units T1 . . . T4 also have connectible termination elements which are connected in if they are located at the end of a line in a linear topology to avoid signal reflections at the line end. In the error-free case the termination element BT2 is connected in the redundancy manager RM at the port B2 in the example explained on the basis of FIG. 1; The termination element BT1 is separated from the corresponding port B1. If an error occurs as has been explained in the example by the interruption 12 the redundancy manager RM separates the termination element BT2 from the port B2 and the branching units T1 and T3 lying on either side of the error location activate their relevant termination element. This means that even if the line ends are shifted signal reflections are effectively suppressed.

The termination of the cable with a terminating resistor at the two ends of the trunk cable is required for a number of reasons:

The bus signal is defined as a current signal with +10 mA which creates via the terminating resistors with two parallel-switched 100 Ohm resistors which correspond to a 50 Ohm resistance a defined voltage drop of +0.5 V.

The maximum echo delay time in the cable of appr. 20 µs lies at 2 km in the order of magnitude of a signal half wave with approximately 16 µs, so that strong reflections would lead to bit errors. The overlapping should have settled down after a maximum of 20% of the duration of a half wave, corresponding to a line length of less than 300 m. Accordingly the IEC standard only allows drop lines of up to max. 120 m in length, with inherently secure networks of up to max. 30 m in length.

Figure 3:
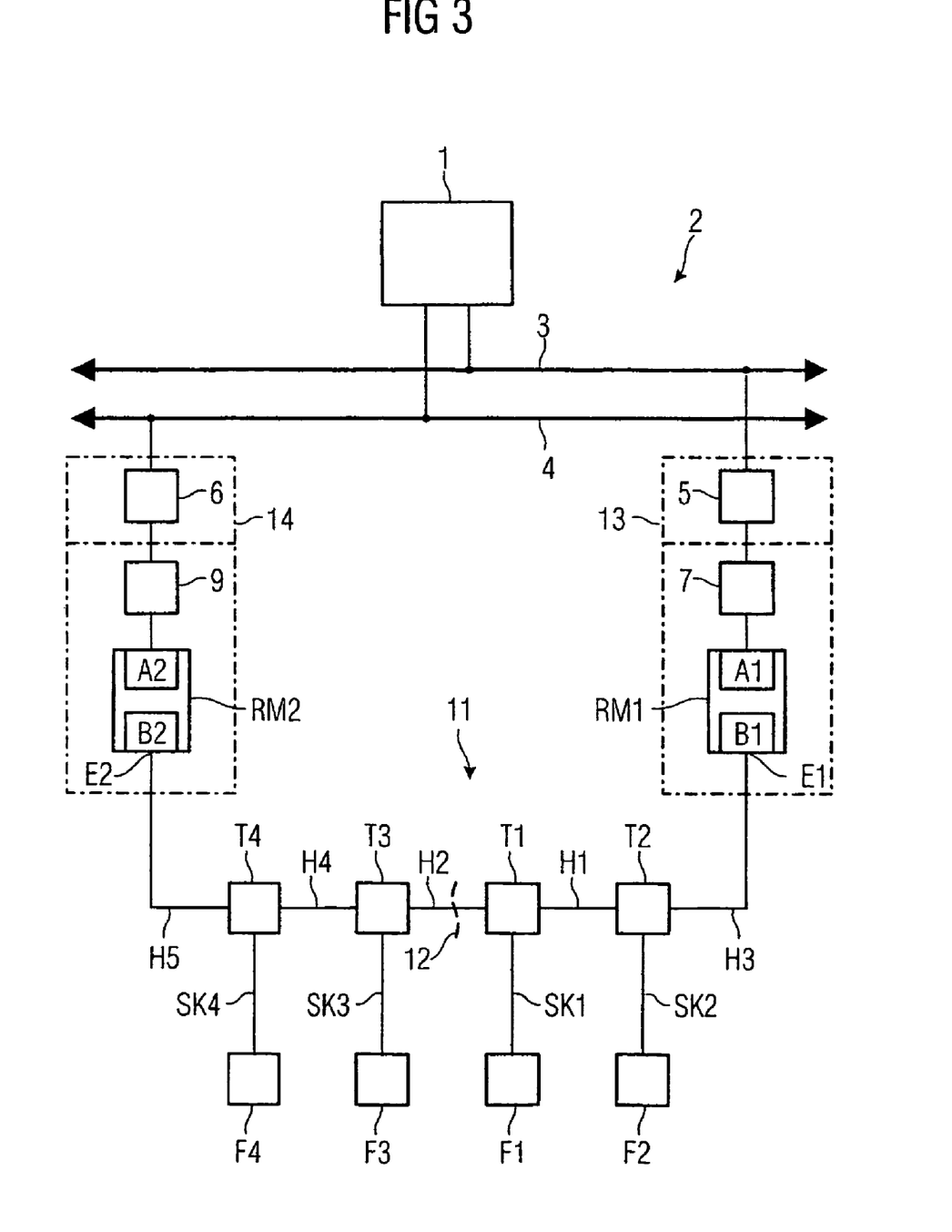
FIG. 3 a block diagram of a part of a automation technology system in an alternate embodiment to FIG. 1, FIG. 4 a block diagram of a branching unit, FIG. 5 a state table of a control unit of a branching unit, FIG. 6 a state diagram corresponding to the state table shown in FIG. 5 and FIG. 7 a basic circuit diagram of an expanded branching unit.

FIG. 3 shows an embodiment of the automation system as per FIG. 1 in which the redundancy manager RM is embodied in two parts. The first redundancy manager part RM1 features the ports A1 and B1 with which it is connected to segment coupler 7 or to the line end E1 of the network 11. The other redundancy manager part RM2 features the ports A2 and B2, with which it is connected to the segment coupler 9 or to the line end E2 of the network 11. As is indicated by the dashed line, the redundancy manager RM1 and the associated segment coupler 7 including the direct current source contained in it and if nec. the link 5, can be grouped together in a first component 13 and the other redundancy manager RM2 with the segment coupler 9 and the associated direct current source and if ne c. the link 6, can be grouped together in a second component 14. The exemplary embodiment shown here has the advantage that the network 11 does not have to be in the form of a ring because the ring is not closed at the line ends E1 and E2 but via the redundancy manager parts 13, 14, the segment couplers 7, 9, the links 5, 6 and the field bus system 2.

The basic structure of a branching unit is described in greater detail below with reference to the example of the branching unit T1 in FIG. 4. The branching unit T1 establishes the connection between the pairs of wires of the trunk cables H1 and H2 and the drop cable SK1. The trunk cables H1 and H2 are connected to the network connections NW1 or NW2 of the branching unit T1. As well as the data, the energy to operate the field devices is also transmitted over two pairs of copper wires H1a and H1b, H2a and H2b, as well as Sa and Sb of the cables H1, H2 or SK1. To this end, as already mentioned, the segment couplers 7 and 9 (cf. FIGS. 1 and 3) each contain a direct current source, with the segment coupler 7 selected by the redundancy manager RM injecting a direct current into the two wires of the transmission cable. The field devices F1 . . . F4 each take a proportion of the direct current and overlay the direct current with an alternating current which contains the information to be transmitted. The branching unit T1 features a control unit ST, which with the aid of currents I1, I2 and/or voltages U1, U2, which are measured on the trunk cables H1 and H 2, monitors the state of the connected cables H1 and H2 and also monitors the voltage U3 on the drop cable leading to the field device F1. Furthermore the branching unit T1 contains a resistance element BT, four switches S0, S1, S2 and S3, a resistance net work consisting of resistors R0, R1 and R2 for voltage measurement and an energy accumulator C in the form of a capacitor. The position of the switches S0 . . . S3 is predetermined by the control unit ST depending on the recorded currents I1 and I2 and/or of the measured voltages U1, U2 and U3. The terminating element BT which can be connected with the aid of the switch S0 for the case in which the branching unit T1 is located at the end of a line, corresponds to a standard terminating resistor of the PROFIBUS PA bus system. The size of the resistors R0, R1 and R2 is selected so that the state of the connected cables H1 and H2 can be determined in the optimum way. They are in this case preferably arranged to be of such high resistance that the current flowing over them is very small by comparison with the current which flows in normal operation over the cables H1 and H2. In this case the line resistances of the cables H1 and H2 are negligibly small.

The functioning of the branching units T1 . . . T4 is explained in greater detail below with reference to the state table shown in FIG. 5 for the control unit ST of the branching unit T1. For the sake of simplicity it is assumed that the three resistors R0, R1 and R2 have the same resistance value. Beginning from the left, the current state of the control unit ST, test criteria for a state transition relating to the voltage U1 and a power ratio K=U2/U1, the settings of the switches S0, S1 and S2, the next state and remarks about the case concerned are entered in the columns of the table. The IDLE state specified in the table corresponds to the basic state which is assumed if the two trunk cables H1 and H2 are not carrying any voltage; I.e. the checked voltages U1 and U2 are equal to zero or at least smaller than a comparison voltage U0, which is to be defined in a suitable manner depending on at the relevant feed voltage. The same applies to a comparison current I0 with which the currents I2 and I1 can be compared. In this state the switches S1 and S2 are in the "on" position, as is specified in the table in the columns in the relevant row of the IDLE state of belonging to the switches S1 and S2. Since the IDLE state is retained the IDLE state is again specified in this case in the column "next state". In the column "K=U2/U1" examples of the voltage ratio between the voltages U2 and U1 are specified for which overshoots and undershoots are monitored by the control unit ST. Depending on the result of the comparison, a transition is made from a current state into a next state. For example the entry in the column "K=U2/U1" of the first row of the state TEST, means that there will be a transfer into the follow-up state TEST2 if the voltage ratio K lies between $\frac{1}{10}$ and $\frac{2}{5}$. The determination of the comparison values, here for example $\frac{1}{10}$ and $\frac{2}{5}$, with which the current voltage ratio K determined by the control unit ST is compared, depends on various peripheral conditions, especially the size of the resistors R0, R1 and R2 and is only specified here as an example. When a feed voltage US is switched on in the segment coupler 7 (FIGS. 1 and 3) this voltage is fed via the redundancy manager RM, the branching unit T2 and the trunk cable H1 to the network connection NW1 of the branching unit T1 and U1=US>U0 applies. The control unit ST thus switches from the IDLE state into the TEST1 state and measures the two voltages U1 and U2. If the trunk cable in the subsequent segment, here the trunk cable H2 is short-circuited, the voltage drop over the resistor R0 will be very much greater than the voltage U2 measurable at the network connection NW2 or at the cable H2; i.e. K=U2/U1<$\frac{1}{10}$. This corresponds to the second row of the state TEST1 in the table. Because of the result of this test the state SHORT is assumed as the next state. In this case the switch S2 remains in the "on" position and the short-circuited trunk cable H2 is disconnected from the cable segment lying in front of it, the trunk cable H1. The connection via the high-impedance resistor R0 can in this case be ignored. Simultaneously the line end produced in this way is terminated by switching over the switch S0 to the position "on" via the termination element BT with the correct surge resistance.

In accordance with first row of the state TEST2 there is a transition from this state into the state OK if the voltage ratio K lies between $\frac{1}{10}$ and $\frac{2}{5}$. In the state OK the switches S0, S1, S2 are in the "off" position and both trunk cables H1 and H2 connected to the branching unit T1 are in order. Further distinctions between cases and state transitions which are produced by the various measurements of the voltages U1 and U2 by the control unit ST can be seen from the state diagram in FIG. 6.

Figure 5:
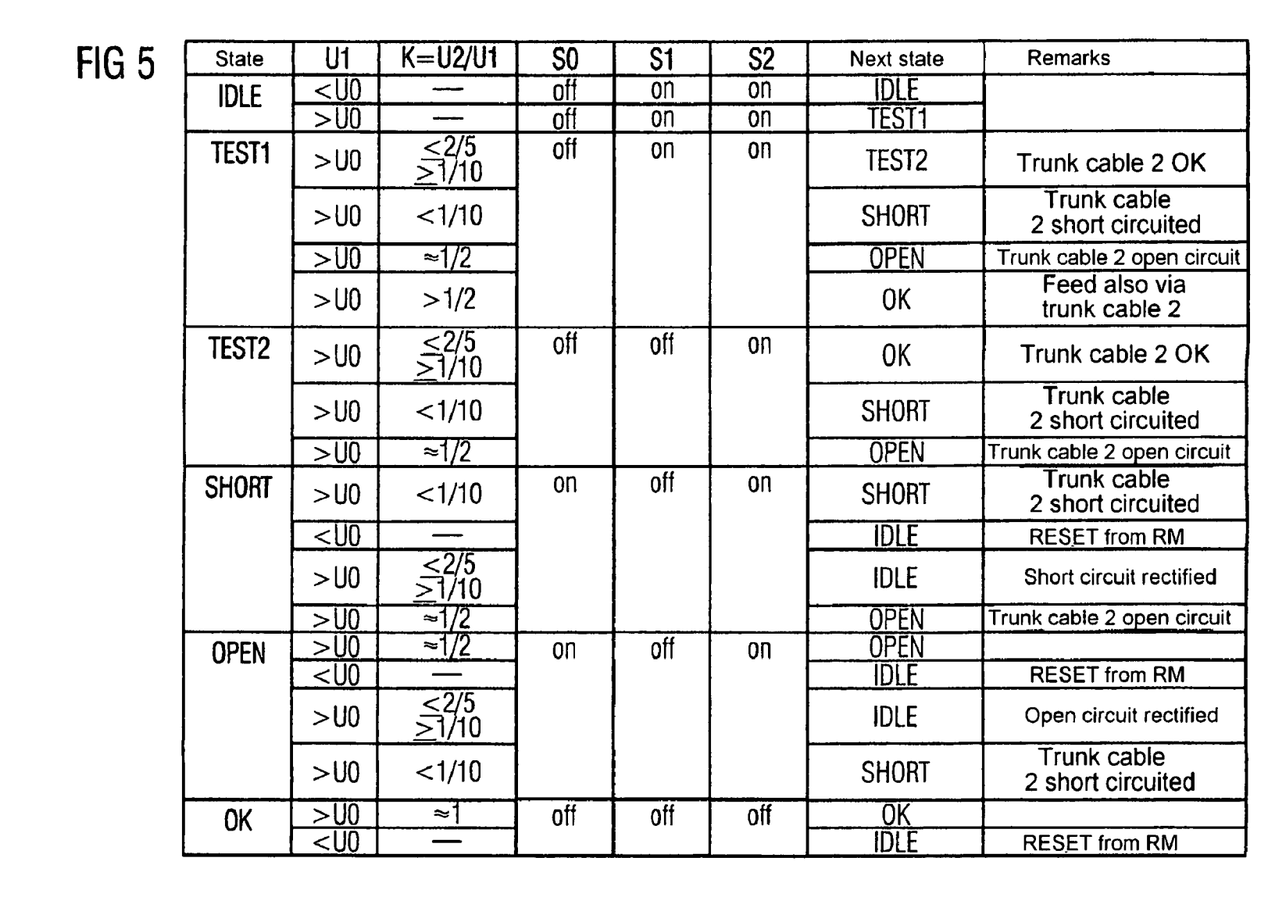

In the example explained above the feed voltage was fed to the branching unit T1 via the trunk cable H1. If this voltage is fed alternately via the trunk cable H2 the associated state table can be simply obtained by swapping over the indices for the voltages U1 and U2.

The states SHORT (trunk cable H2 short circuited) and OPEN (trunk cable H2 open circuited) are error states which lead to the injection of the feed voltage by the redundancy manager RM via both ports B1 and B2. If the error concerned is rectified the branching unit T1 involved is initially switched to the state IDLE. Since the switch S0 is in the "off" position and in this case, the linear network 11 fed from both sides has no line termination. This leads to an increase in the signal amplitude which is detected by the second control unit RMCB of the redundancy manager RM and which causes the latter to open the switch RMS3 and thus cancel the power feed at the port B2 again. As a result of the now error-free Network 11 the actual operating state OK is reached via the state TEST1.

In the exemplary embodiment described the determination of the state of the cable segment to be monitored uses the ratio between output and input voltage of the branching unit. Instead this state can also for example be determined from the absolute values of the voltages and the currents.

Figure 4:
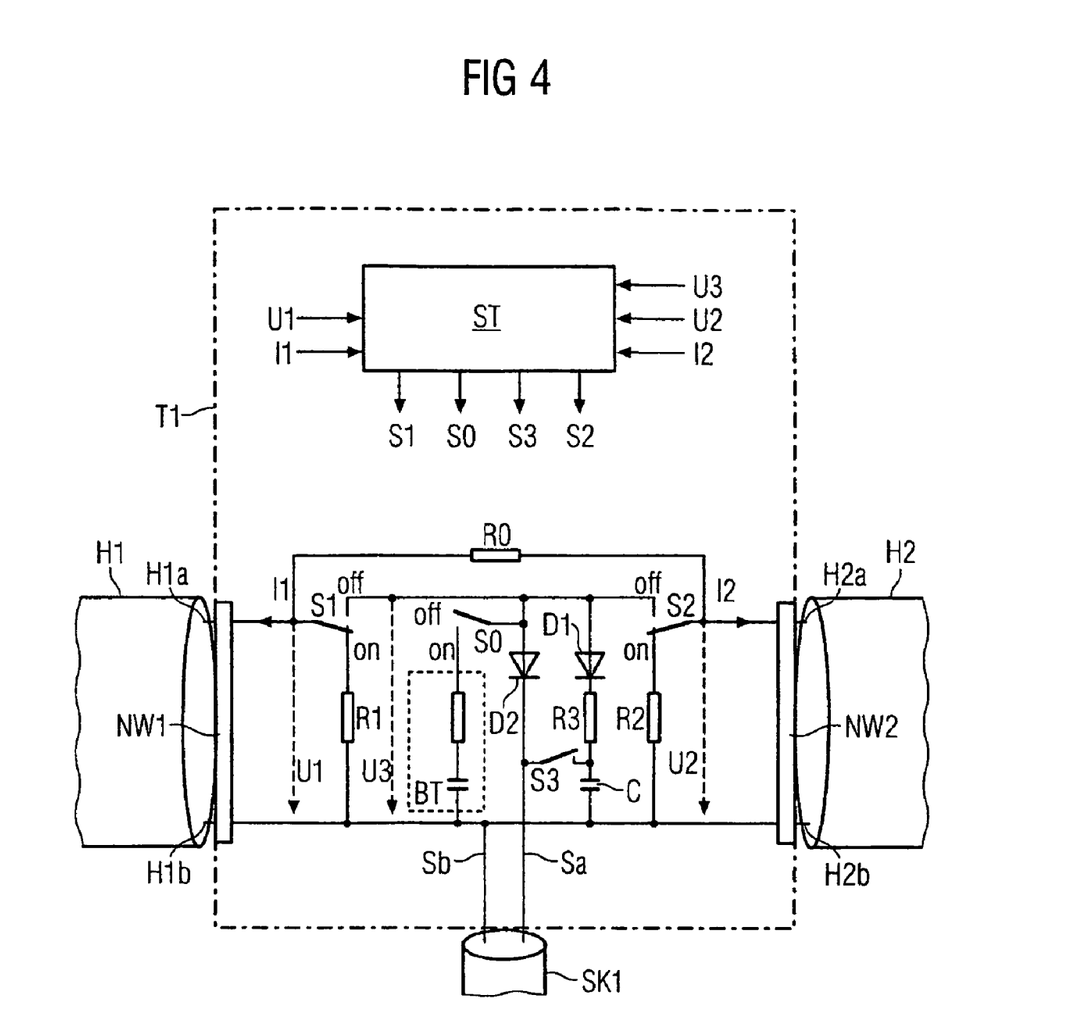

The capacitor C shown in FIG. 4 is used to ensure an interruptible power supply for the user device F1 connected to the branching unit T1 even in the period caused by switching delays between the occurrence of an error and the establishment of the alternate energy supply. To this end the capacitor C is charged with the feed voltage in the operating phase if at least one of the switches S1, S2 is in the "off" position via a decoupling diode D1 and a charge resistor R3. The control unit ST monitors the voltage U3 present on the drop cable SK1 to the user device F1 and switches the capacitor C via the switch S3 to the drop cable SK1 if it detects a voltage U3 which is too low. The decoupling diode D1 and a further decoupling diode D2 prevent a flow back of energy into the network 11.

A RESET of the system can be initiated manually automatically by the redundancy manager RM and briefly switching off the feed voltage to the ports B1 and B2, after which via the IDLE state a new test cycle is initiated, running through the TEST' and TEST2 states.

The embodiment of a network described has the advantages that the branching units can draw their comparatively low operating energy from the trunk cable, the control units ST of the branching units operate independently and the signal path can be embodied as a passive path since there are only resistors and switches between the network connections of the branching units. An active solution, for example with a signal refresh as with repeaters is however also possible.

Figure 6:
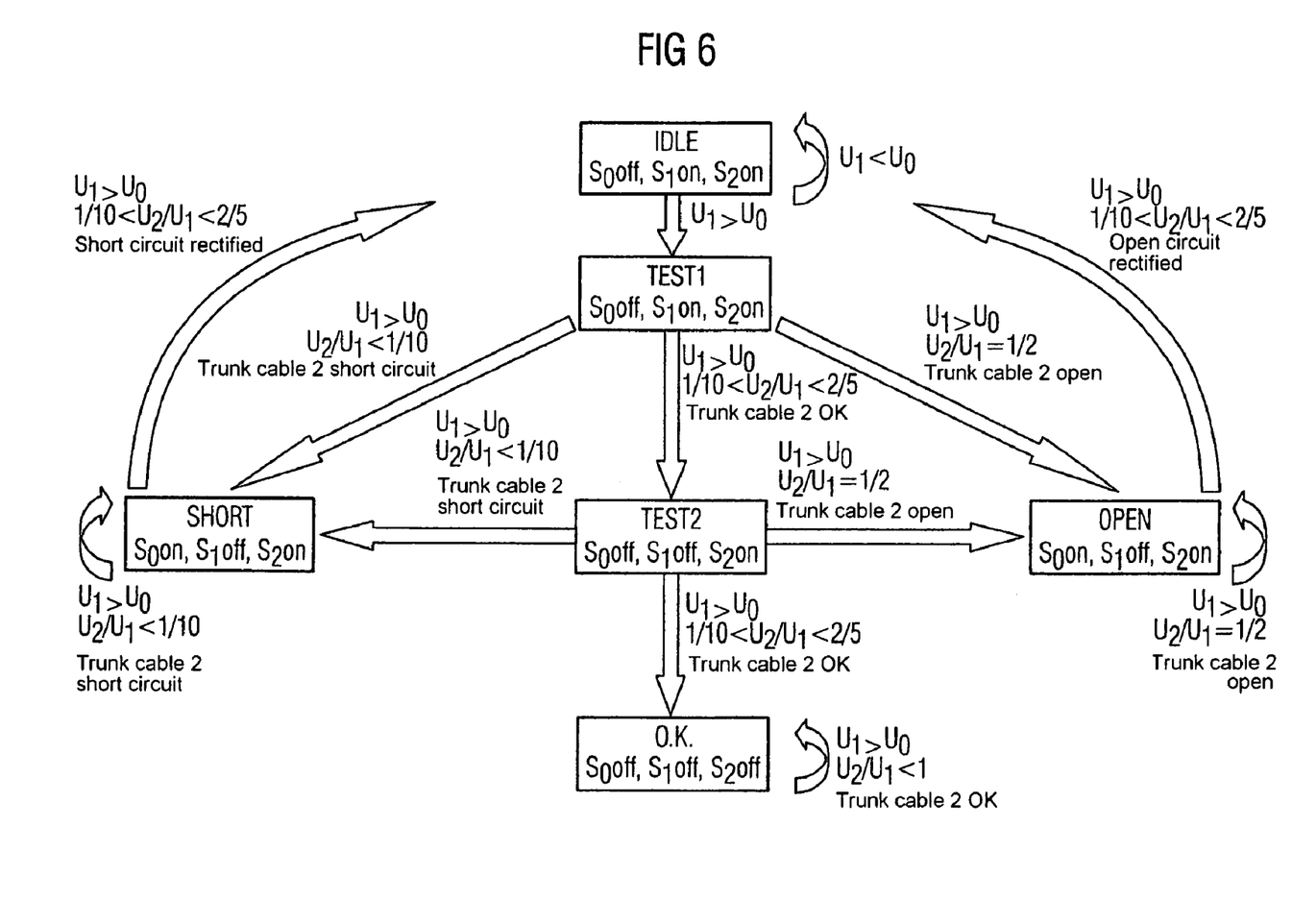

In FIG. 6 the states and state transitions of the table from FIG. 5 are shown once again for a better overview in the form of a state diagram which describes the same behavior of the control unit ST as the table. The following applies to all states: For U1<U0 a RESET is performed by the redundancy manager RM and the sequence begins with the IDLE state.

Figure 7:
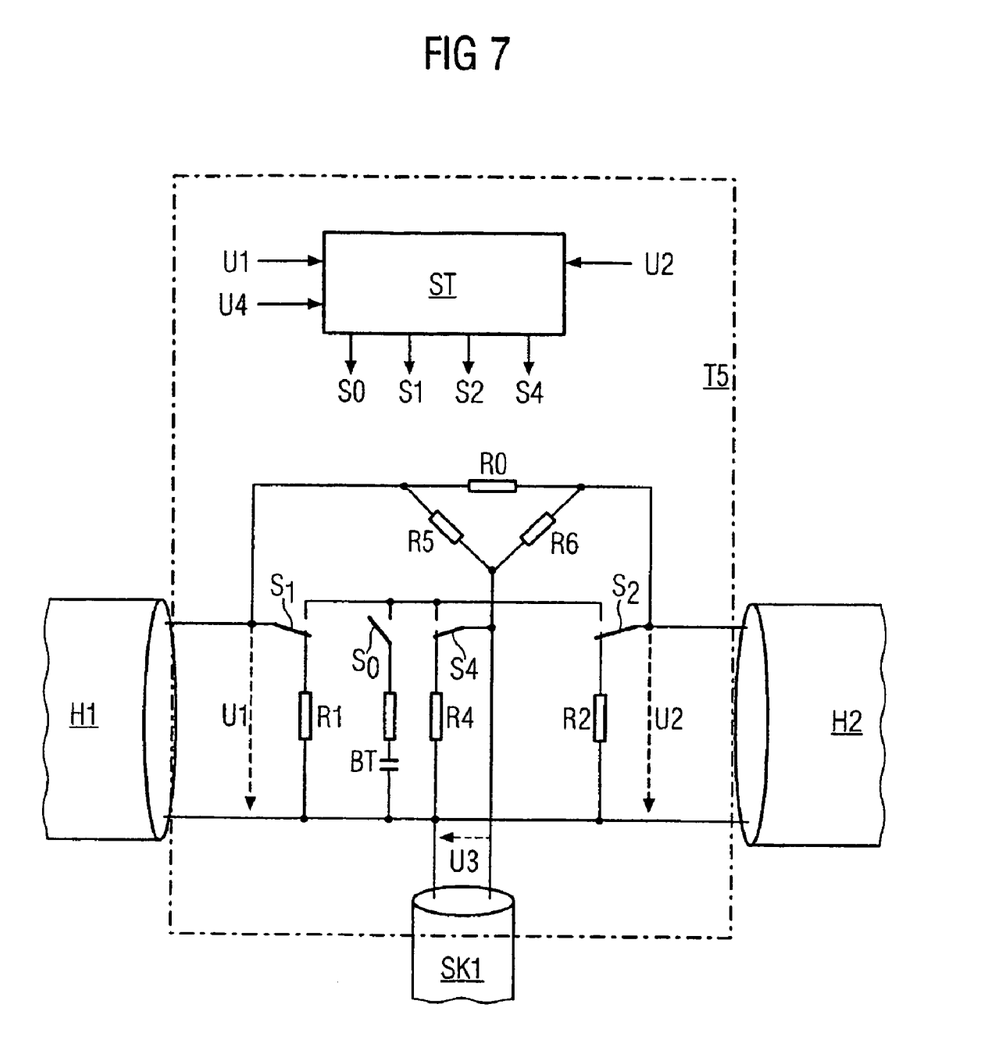

For the exemplary embodiment described above a short circuit in the drop cable SK1 is not dealt with. It are can however be expanded in a simple manner so that all cables connected to a branching unit can be monitored. FIG. 7 shows a basic circuit diagram of a branching unit T5 expanded in this way which by comparison with the branching unit T1 explained with reference to FIG. 4 has been expanded by a switch S4 and resistors R4, R5 and R6. The principle of monitoring three cables is similar to the monitoring of two cables described above and can thus be understood per se by person skilled and the art with reference to FIG. 7.

In the exemplary embodiment described the branching units are set up separately from the field devices and merely connected to the latter via a drop cable in each case. As an alternative to this a branching unit can be integrated into the housing of the field device concerned.

Alternatively to the branching unit shown in FIG. 4 with a drop cable connection it is possible to embody the unit without a drop cable connection or not connect a drop cable. This makes it possible to divide the network line up into predetermined line segments which can be monitored individually. Errors can be localized and rectified more simply in this way.

A further alternative is to equip the branching units with a number of drop cable connections for field devices.

If the error is to be repaired after the error location has been determined, unstable states for example in the form of intermittent contacts can occur by which operation of the system will be adversely affected. To avoid this provision can be made for fixing the states at the network connections of the branching unit which can for example be done by a short circuit connectors which are then removed again after repair. This state fixing can also be used with the corresponding layout for explicitly deactivating individual cable segments and thus makes maintenance work easier in an explosion-hazard area. In this case there is the option of mechanically covering the terminals of the network connections which may not be worked on, with the coverings being designed so that when they are removed both the short circuit mentioned above the occurence of sparks which are capable of ignition arising is prevented.

The invention claimed is:

1. A network having redundancy properties, comprising:
   a redundancy manager;
   at least one branching unit for connecting a user device to the network; and
   a line having two line ends, the two line ends connected to the redundancy manager, the redundancy manager to:
   disconnect the two line ends from each other in an error-free state of the line;
   connect the two line ends in an error state of the line; and
   feed a supply voltage into one of the two line ends for supplying a user device connected to the network via the branching unit, wherein
   the branching unit is arranged in the network line such that a first cable having a first cable end of the network line is connected to a first network connection of the branching unit and a second cable having a second cable end of the network line is connected to a second network connection of the branching unit,
   the branching unit to:
   check a state of the first cable if the supply voltage is received at the second network connection and to check a state of the second cable if the supply voltage is received at the first network connection; and
   forward the supply voltage to the checked cable only if the checked cable has an error-free state, and
   the redundancy manager to:
   feed a further supply voltage to the first line end if the supply voltage is fed to the second line end and is not detected at the first line end after lapse of a predetermined period of time by the redundancy manager; and
   feed the further supply voltage to the second line end if the supply voltage is fed to the first line end and is not detected at the second line end after lapse of the predetermined period of time by the redundancy manager.

2. The network in accordance with claim 1, wherein the network is a PROFIBUS PA network.

3. The network in accordance with claim 1, wherein the redundancy manager and the branching unit each include a termination element connected to the first or second line end if the redundancy manager or the branching unit are arranged at the respective first or second line end.

4. The network in accordance with claim 1, wherein the branching unit comprises two switches and a control unit, the two switches actuated by the control unit such that a user device connected to the branching unit can be selectively connected to the first or to the second network connection or to both the first and second network connections for maintaining power supply to the user device and for maintaining data transmission from the user device to the network.

5. The network in accordance with claim 4, wherein
   the branching unit comprises a resistor network including the two switches, and
   the switches are actuated by the control unit such that a current or a voltage related to the first or second cable can be checked by the control unit.

6. The network in accordance with claim 1, wherein the branching unit comprises an energy accumulator charged by the supply voltage at least in the error-free state, and the branching unit measures a voltage present at the user device connected to the network via the branching unit and to connect the energy accumulator to the user device if the measured voltage corresponds to a voltage deficit.

7. The network in accordance with claim 1, comprising a plurality of branching units, wherein the redundancy manager includes a recording unit for recording the timely behaviour of a voltage or a current related to the supply voltage at the first or second line end during forwarding of the supply voltage by any of the branching units and for determining the number of branching units fed by the supply voltage up to a physical error location.

8. The network in accordance with claim 1, wherein the redundancy manager includes a further recording unit for recording changes of a voltage or a related to the supply voltage at the first or second line end and for determining a state transition of the network.

9. A network having redundancy properties, comprising
a line including first and second line ends, the first and second line ends connected to a redundancy manager;
the redundancy manager to:
disconnect the first and second line ends from each other in an error-free state of the line;
connect the first and second line ends in an error state of the line;
feed a supply voltage into the first or second line end for supplying a user device connected to the network via a branching unit;
feed a further supply voltage to the first line end if the supply voltage is fed to the second line end and is not detected at the first line end after lapse of a predetermined period of time by the redundancy manager;
feed the further supply voltage to the second line end if the supply voltage is fed to the first line end and is not detected at the second line end after lapse of the predetermined period of time by the redundancy manager; and
a plurality of branching units and a recording unit for recording the timely behavior of a voltage or a current related to the supply voltage at the first or second line end during forwarding of the supply voltage by any of the branching units and for determining the number of branching units fed by the supply voltage up to a physical error location.

10. The network in accordance with claim 9, further comprising a communication interface for connecting the redundancy manager to a higher-ranking network and for exchanging data with the higher-ranking network.

11. The network in accordance with claim 10, further comprising at least two segment couplers for connecting the redundancy manager to at least two communication channels of the higher-ranking network, the higher-ranking network embodied as a redundant network, wherein the redundancy manager is to:
monitor a functionality of the at least two segment couplers; and
select one of the segment couplers for connecting the redundancy manager to the network having redundancy properties.

12. A method of operating a network having redundancy properties, the network comprising a line having first and second line ends connected to a redundancy manager, the method comprising:
disconnecting the first and second line ends from each other in an error-free state of the line;
connecting the first and second line ends in an error state of the line;
feed a supply voltage into the first or second line end for supplying a user device connected to the network via a branching unit;
feed a further supply voltage to the first line end if the supply voltage is fed to the second line end and is not detected at the first line end after lapse of a predetermined period of time by the redundancy manager;
feed the further supply voltage to the second line end if the supply voltage is fed to the first line end and is not detected at the second line end after lapse of the predetermined period of time by the redundancy manager;
detecting an open or short circuit in a segment of the network line within a branching unit on an intermediate portion of the network line, and
disconnecting the segment from the network line automatically by the branching unit.

13. A network with redundancy properties, comprising:
a plurality of electrical signal branching units linked sequentially via a plurality of trunk lines, wherein each trunk line is a portion of a communication line for data and power communication;
each branching unit comprising a first network connection to one of the trunk lines, a second network connection to an other of the trunk lines, and a trunk-terminating resistor that controllably terminates the communication line;
the communication line comprising first and second ends connected to respective first and second ports of a redundancy manager;
first and second line-terminating resistors in the redundancy manager that controllably terminate the respective first or second ends of the communication line;
a third port on the redundancy manager connected to a data/power bus system;
wherein the redundancy manager connects the third port to the first port, connects the second line-terminating resistor to terminate the second end of the communication line, then monitors a voltage received from the second end of the communication line for a threshold value indicating acceptable transmission of power though the communication line, and if the monitored voltage falls below a threshold value, the redundancy manager electrically connects the first and second ports together, and disconnects the second line-terminating resistor;
wherein each branching unit monitors electrical current or voltage on said one or the other of the connected trunk lines, implements a state transition table to detect a short or open circuit in a failed said one or the other trunk line, and upon detecting the short or open circuit disconnects the failed trunk line, and connects the trunk-terminating resistor to terminate the communication line; and
wherein if a given trunk line develops a short or open circuit, a branching unit connected thereto disconnects the given trunk line from the communication line, and the redundancy manager restores data/power to all of the branching units by connecting the first and second ports together, thereby communicating data and power on the communication line in two directions from the redundancy manager to reach all of the branching units.

14. The network in accordance with claim 13, further comprising two switches and a control unit, the two switches actuated by the control unit such that a user device connected to the branching unit can be selectively connected to the first or to the second network connection or to both the first and second network connections for maintaining power supply to the user device and for maintaining data transmission from the user device to the communication line.

15. The network in accordance with claim 14, further comprising a resistor network including the two switches, wherein the switches are actuated by the control unit such that a current or a voltage related to the first or second cable connected to the respective first or second network connection can be checked by the control unit.

16. The network in accordance with claim 14, further comprising an energy accumulator charged by a power voltage on the communication line at least in an error-free state of the communication line, wherein the branching unit measures a voltage present at the user device connected to the branching unit, and connects the energy accumulator to the user device if the measured voltage corresponds to a voltage deficit.

17. The network in accordance with claim 13, wherein the first and second network connections are selectively fixed in a predetermined electrical state for performing maintenance or repair work.

\* \* \* \* \*